(12) United States Patent
Beyfuss et al.

(10) Patent No.: US 11,846,320 B2
(45) Date of Patent: Dec. 19, 2023

(54) CAGE SEGMENT FOR A ROLLING-ELEMENT BEARING CAGE

(71) Applicant: AKTIEBOLAGET SKF, Gothenburg (SE)

(72) Inventors: Berthold Beyfuss, Wasserlosen-Kaisten (DE); Hans-Juergen Friedrich, Königsberg-Römershofen (DE); Alfred Radina, Poppenlauer (DE); Maximilian Soellner, Bundorf (DE); Jonas Schierling, Hassfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/835,089

(22) Filed: Jun. 8, 2022

(65) Prior Publication Data

US 2022/0403886 A1    Dec. 22, 2022

(30) Foreign Application Priority Data

Jun. 18, 2021  (DE) .......................... 102021206285.7

(51) Int. Cl.
*F16C 33/50* (2006.01)
*F16C 33/46* (2006.01)
*F16C 33/54* (2006.01)
*F16C 43/06* (2006.01)

(52) U.S. Cl.
CPC ........ *F16C 33/502* (2013.01); *F16C 33/4605* (2013.01); *F16C 33/543* (2013.01); *F16C 43/065* (2013.01); *F16C 2300/14* (2013.01)

(58) Field of Classification Search
CPC .............. F16C 33/4605; F16C 33/4676; F16C 33/4682; F16C 33/50; F16C 33/502; F16C 33/506; F16C 33/51; F16C 33/513; F16C 33/541; F16C 33/542; F16C 33/543; F16C 33/547; F16C 2226/36; F16C 2300/14; B21D 53/12
See application file for complete search history.

(56) References Cited

U.S. PATENT DOCUMENTS 2,269,224 A    1/1942  Reilly
2,417,559 A *  3/1947  Larson ................ F16C 19/545
                                            384/573
2,591,160 A    4/1952  Kilian
(Continued)

FOREIGN PATENT DOCUMENTS

CN    103415717 A    11/2013
CN    104475350 A     4/2015
(Continued)

OTHER PUBLICATIONS

DE102015206533_A1_Description.*
(Continued)

*Primary Examiner* — Phillip A Johnson
(74) *Attorney, Agent, or Firm* — J-TEK LAW PLLC; Scott T. Wakeman; Mark A. Ussai

(57) ABSTRACT

A cage segment defines a single pocket of a multipart rolling-element bearing cage and includes first and second circumferentially spaced side walls connected by first and second end walls. The first and second side walls and the first and second end walls are formed by at least one sheet metal segment connected at at least one joint.

18 Claims, 3 Drawing Sheets

(56) References Cited

U.S. PATENT DOCUMENTS

| | | | |
|---|---|---|---|
| 2,721,776 A * | 10/1955 | Ruist | F16C 19/362 |
| | | | 384/578 |
| 2,946,633 A * | 7/1960 | Gothberg | F16C 33/485 |
| | | | 384/909 |
| 3,202,467 A | 8/1965 | Karl-Albert | |
| 3,313,582 A | 4/1967 | Henry | |
| 3,353,246 A | 11/1967 | Farmer | |
| 3,356,428 A | 12/1967 | Ralph | |
| 3,365,775 A | 1/1968 | Cavagnero et al. | |
| 3,473,857 A | 10/1969 | Pitner | |
| 3,526,026 A | 9/1970 | Warchol | |
| 3,605,247 A | 9/1971 | Bingle et al. | |
| 3,626,565 A | 12/1971 | Koch | |
| 3,820,867 A | 6/1974 | Dickinson et al. | |
| 3,902,772 A | 9/1975 | Spate | |
| 3,992,764 A | 11/1976 | Serasio | |
| 4,397,507 A | 8/1983 | Kraus et al. | |
| 4,577,088 A | 3/1986 | Sharp | |
| 4,821,386 A | 4/1989 | Simon et al. | |
| 4,942,652 A | 7/1990 | Hazebrook et al. | |
| 5,187,345 A | 2/1993 | Alling et al. | |
| 5,199,170 A | 4/1993 | Mori et al. | |
| 5,255,985 A | 10/1993 | Alling | |
| 5,528,706 A | 6/1996 | Harimoto et al. | |
| 5,795,080 A | 8/1998 | Fujiwara et al. | |
| 6,330,748 B1 | 12/2001 | Müntnich et al. | |
| 6,752,535 B2 | 6/2004 | Krochak | |
| 6,883,968 B2 | 4/2005 | Fugel et al. | |
| 6,955,476 B1 | 10/2005 | Murai | |
| 7,571,706 B2 | 8/2009 | Ichikawa et al. | |
| 8,696,210 B2 | 4/2014 | Kawai et al. | |
| 8,770,854 B2 | 7/2014 | Friedrich et al. | |
| 9,239,077 B2 | 1/2016 | Doki-Thonon et al. | |
| 9,382,947 B2 | 7/2016 | Ishibashi | |
| 9,429,194 B2 | 8/2016 | Reimchen | |
| 9,512,881 B2 | 12/2016 | Katayama et al. | |
| 9,551,377 B2 | 1/2017 | Haas et al. | |
| 11,149,793 B2 | 10/2021 | Friedrich et al. | |
| 2007/0248298 A1 | 10/2007 | Chihara | |
| 2008/0245631 A1 | 10/2008 | Bochen et al. | |
| 2012/0063713 A1* | 3/2012 | Beuerlein | F16C 33/502 |
| | | | 384/578 |
| 2012/0170883 A1 | 7/2012 | Evans et al. | |
| 2013/0034321 A1 | 2/2013 | Beck et al. | |
| 2013/0308890 A1 | 11/2013 | Steblau | |
| 2015/0159696 A1 | 6/2015 | Manne et al. | |
| 2016/0017919 A1 | 1/2016 | Haas et al. | |
| 2019/0226528 A1 | 7/2019 | Hainz et al. | |
| 2021/0372475 A1 | 12/2021 | Friedrich et al. | |
| 2022/0403883 A1 | 12/2022 | Beyfuss et al. | |
| 2022/0403885 A1 | 12/2022 | Beyfuss et al. | |
| 2022/0403886 A1 | 12/2022 | Beyfuss et al. | |
| 2023/0220877 A1 | 7/2023 | Beyfuss et al. | |
| 2023/0220879 A1 | 7/2023 | Beyfuss et al. | |

FOREIGN PATENT DOCUMENTS

| | | |
|---|---|---|
| CN | 104847794 A | 8/2015 |
| CN | 104847795 A | 8/2015 |
| CN | 105605100 A | 5/2016 |
| CN | 106271725 A | 1/2017 |
| CN | 206215979 U | 6/2017 |
| CN | 107120357 A | 9/2017 |
| DE | 2111081 A1 | 9/1972 |
| DE | 3130610 A1 | 2/1983 |
| DE | 19910928 A1 | 9/2000 |
| DE | 10065169 A1 | 7/2002 |
| DE | 102006045436 A1 | 3/2008 |
| DE | 102008034922 A1 | 2/2010 |
| DE | 102009017751 A1 | 10/2010 |
| DE | 102009034018 A1 | 12/2010 |
| DE | 102009004657 B4 | 2/2011 |
| DE | 102012221097 A1 | 5/2014 |
| DE | 102013218286 A1 | 3/2015 |
| DE | 102015210924 A1 | 7/2016 |
| DE | 102015206533 A1 * | 10/2016 |
| DE | 102015206533 A1 | 10/2016 |
| DE | 102016201052 A1 | 7/2017 |
| DE | 102016216286 A1 | 3/2018 |
| DE | 102016222336 A1 | 5/2018 |
| DE | 102017117010 A1 | 7/2018 |
| DE | 102017127529 A1 | 5/2019 |
| DE | 102019115335 A1 | 12/2020 |
| EP | 0074803 A1 | 3/1983 |
| EP | 2213894 A1 | 8/2010 |
| EP | 2677184 A1 | 12/2013 |
| EP | 2677184 A1 * | 12/2013 ......... F16C 33/4611 |
| EP | 2839175 B1 | 5/2016 |
| EP | 4105506 A1 | 12/2022 |
| FR | 2234483 A1 | 1/1975 |
| FR | 2514440 A1 | 4/1983 |
| FR | 2612102 A1 | 9/1988 |
| FR | 3013087 A1 | 5/2015 |
| GB | 1431612 A | 4/1976 |
| GB | 2103307 A | 2/1983 |
| JP | H0742744 A | 2/1995 |
| JP | H0742744 U | 8/1995 |
| JP | 07317773 A | 12/1995 |
| JP | H07317773 A | 12/1995 |
| JP | H08270658 A | 10/1996 |
| JP | 2005076697 A | 3/2005 |
| JP | 2006064044 A | 3/2006 |
| JP | 2007247856 A | 9/2007 |
| JP | 2008215390 A | 9/2008 |
| JP | 2008215615 A | 9/2008 |
| JP | 2009243556 A | 10/2009 |
| JP | 4786124 B2 | 10/2011 |
| JP | 2013007435 A | 1/2013 |
| JP | 2013061076 A | 4/2013 |
| JP | 2013108587 A | 6/2013 |
| JP | 2017026083 A | 2/2017 |
| JP | 6197844 B2 | 9/2017 |
| NL | 6910823 A | 3/1970 |
| WO | 2008040290 A1 | 4/2008 |
| WO | 2014136816 A1 | 9/2014 |
| WO | 2015022355 A1 | 2/2015 |
| WO | 2018109784 A1 | 6/2018 |

OTHER PUBLICATIONS

European Search Report from the European Patent Office dated Oct. 28, 2022 in related EP application No. 22 178 210.5, including European Search Opinion, and translation thereof.

Office Action from the United States Patent Office dated Mar. 2, 2023 in related U.S. Appl. No. 17/400,177.

Office Action from the United States Patent Office dated Mar. 30, 2023 in related U.S. Appl. No. 17/350,081.

Laserjob, Inc., Laser Material Processing, Oct. 2012, p. 2 (Year: 2012).

Unpublished U.S. Appl. No. 17/835,086.

European Search Report from the European Patent Office dated Oct. 21, 2022 in corresponding EP application No. 22178211.3, including European Search Opinion, and translation thereof.

Extended European Search Report from the European Patent Office dated May 12, 2023, in related application No. EP 23150846.6, including European Search Opinion.

Extended European Search Report from the European Patent Office dated May 12, 2023, in related application No. EP 23150847.4, including European Search Opinion.

Office Action from the United States Patent Office dated Jun. 1, 2023 in related U.S. Appl. No. 17/835,086.

* cited by examiner

CAGE SEGMENT FOR A ROLLING-ELEMENT BEARING CAGE

CROSS-REFERENCE

This application claims priority to German patent application no. 10 2021 206 285.7 filed on Jun. 18, 2021, the contents of which are fully incorporated herein by reference.

TECHNOLOGICAL FIELD

The present disclosure is directed to a cage segment for a rolling-element bearing cage formed from at least one segment of sheet metal.

BACKGROUND

Rolling elements in rolling-element bearings can be guided and retained, for example, by rolling-element bearing cages. This can be of use not only in the operation of the rolling-element bearing, but also during the assembly of the rolling-element bearing. It is known that rolling-element bearing cages can be manufactured on the one hand from metal by various manufacturing methods, and on the other hand from a plastic, for example, by an injection-molding method. Due to the temperature behavior and the required strength of the material, it can be necessary to use in particular a fiberglass-reinforced plastic, such as, for example, fiberglass-reinforced polyether ether ketone (PEEK). However, especially in large bearings, these rolling-element bearing cages can already be very expensive due to the large amount of material required, in particular with plastics having a high price per kilogram. Larger metal cages are usually manufactured by bulk material first being rolled and then further processed by machining. "Known methods" here are understood to mean that they require on the one hand a high material usage, and on the other hand a combination of several, sometimes complex, manufacturing methods using different machine tools with the result that the manufacturing can be complex and/or cost-intensive.

SUMMARY

It is therefore an aspect of the present disclosure to provide a cage segment for a rolling-element bearing cage, which cage segment can be manufactured in a simple and cost-effective manner.

In the following a cage segment is disclosed for a multipart rolling-element bearing cage, in particular for large rolling-element bearings. The cage segment can in particular be a cage segment for a roller bearing, i.e., a rolling-element bearing including roller-shaped rolling elements, such as, for example, tapered rollers, cylindrical rollers, barrels, needles, and the like. In order to reduce the material required and the manufacturing expense, in a preliminary stage of the manufacturing, the cage segment is present as a preform or a kit that is comprised of one or more flat sheet metal components. The sheet metal components are configured to be joined in order to form the cage segment. Here in its assembled form the cage segment includes at least one joint at which two ends of the sheet metal component or components is/are joined in order to form a pocket that is suitable to receive at least one rolling element. That is, with a sheet metal component, the sheet metal component is joined at its ends. Due to the use of sheet metal, in comparison to a conventional cage segment, in particular made of plastic, the cage segment can be made thinner which allows for a smaller spacing between the rolling elements. Thus even in large rolling-element bearings, more rolling elements can be housed in the rolling-element bearing, whereby an efficiency of the rolling-element bearing can be increased. A large rolling-element bearing can in particular be a rolling-element bearing having a diameter of more than one meter.

The metal plate can in particular be a metal sheet, a sheet metal panel, a sheet metal ribbon, in particular a coiled sheet metal ribbon (a so-called coil) or the like. Sheet metal can be processed and shaped easily and cost-effectively, for example, by cutting, laser cutting, embossing, deep-drawing, and bending. Furthermore, a machining process method can be omitted so that a degree of material utilization can be increased.

The one or more sheet metal components of the cage segment are preferably cut from a metal sheet, in particular laser-cut, punched, and/or nibbled. In other words, the separating lines required for the cage segment are provided in the metal sheet by cutting, in particular laser cutting, punching, and/or nibbling. This means that the contour of the cage segment is first cut, punched, and/or nibbled into the metal plate, and subsequently the shape of the cage segment is released from the metal plate. Here a laser, a punching tool, a nibbling machine, or the like can be used.

According to a further preferred embodiment, the cage segment is provided with at least one functional element. Furthermore, in the assembled form of the cage segment, the at least one functional element can be shaped out from the plane of the sheet metal component, in particular bent out. The functional element can thereby be better brought into abutment with an element with which the functional element is to interact. Furthermore, a functional element, protruding toward the pocket or away from the pocket, can serve to generate a spacing between the individual rolling elements, in particular in the case in which the sheet metal components are manufactured, for strength or design reasons, from a relatively thin metal sheet. That is, the functional element protruding toward the pocket or away from the pocket can be configured in particular to compensate for a lack sheet metal thickness.

Preferably at least one of the sheet metal components of the preliminary stage of the cage segment is provided with a contour, wherein in the assembled form of the cage segment the contour is configured to form the at least one functional element. That is, during releasing of the sheet metal component, the functional elements can be at least partially co-shaped, so that an additional shaping step can be omitted. Due to the contouring of the cage segment in order to form the at least one functional element, a part of the material of the sheet metal component is also removed, whereby the resulting cage segment is lighter. The positioning of the functional element can also be done more precisely. The contour is preferably cut, in particular laser cut. Alternatively or additionally, the contour can also be punched and/or nibbled.

The at least one functional element is preferably a retaining element that is configured to interact with a rolling element in order to hold the rolling element, wherein in the assembled form of the cage segment, the retaining element faces toward and/or away from the pocket. In particular, a retaining element can be configured to hold a rolling element in the pocket of the cage segment, in particular at a desired position. Alternatively or additionally, the retaining element can be configured as a tab so that a rolling element can be snapped into the cage segment and the rolling element does not release from the cage segment, for example, even during an overhead installation. For example, the retaining element can be configured to prevent the cage segment from migrating radially outward, and/or to ensure that the cage segment remains around the rolling element.

Furthermore, the at least one functional element can be a guide element that is configured to interact with a flange in order to guide the cage segment, and the guide element faces the flange in the assembled form of the cage segment. By a guiding against a flange of the rolling-element bearing, a guiding of the rolling-element bearing cage against a raceway of the rolling-element bearing can advantageously be omitted, whereby the service life of the raceways can be increased.

Furthermore, the at least one functional element can be a connecting element that is configured to interact with a coupling element in order to connect the cage segment to a further cage segment. The cage segments can be additionally held together by the coupling element, whereby the cage composite gains stability, and/or an installation of the cage can be simplified. The cage segments can be guided by the coupling element, which can be, for example, a cable, wire, or a ring, and has a defined preload.

The connecting element can preferably include at least one eyelet through which the coupling element is threadable. In one design of the connecting elements as eyelets, the coupling element can be guided through these eyelets in a simple manner and removed again if required. Here the coupling element is not fixed to the eyelets, but rather can move in the eyelets. A clearance between the cage segments, and thus the rolling elements, and a movement of the cage segments with respect to one another is thereby not restricted. Alternatively, the eyelets can also be configured as open hooks or loops into which the coupling element is mountable or clippable or snappable.

According to a further preferred embodiment, at the joint the cage element includes a first alignment element at the first end and a second alignment element at the second end, the second alignment element being complementary to the first alignment element, and the first and the second alignment element interacting in order to fix the first end and the second end in at least a first direction. For example, the alignment elements can be configured to align the first and the second end such that the cage segment has an edge-free or step-free surface lying opposite a raceway of a rolling-element ring. Furthermore, the alignment element can also be configured to provide an adjustment possibility in a second direction perpendicular to the first direction so that the joint is suitable to compensate for manufacturing tolerances. Furthermore, the first and the second alignment element can be configured to engage into each other. For example, the first alignment element can include a first toothing, and the second alignment element can include a second toothing complementary to the first toothing.

According to another embodiment, a single-pocket cage segment of a multipart rolling-element bearing cage includes first and second side walls connected by first and second end walls. The first and second side walls and the first and second end walls are formed by at least one sheet metal segment having at least two ends connected at at least one joint. At least one of the first and second side walls and/or at least one of the first and second end walls may include at least one functional element comprising a contoured portion of the sheet metal segment.

According to a further aspect, a rolling-element bearing cage is proposed, in particular for large rolling-element bearings, including a plurality of cage segments as described above. Here a plurality of cage segments can be connectable at least temporarily via a coupling element. Here, for example, every second rolling element can be guided in a cage segment. Alternatively a cage segment can also be provided for each rolling element. For example, the outer diameter of the rolling-element bearing cage can be more than 1200 mm.

According to still a further aspect, a rolling-element bearing, in particular a large rolling-element bearing, is proposed including at least one inner ring and at least one outer ring, wherein rolling elements are disposed between the inner ring and the outer ring, wherein the rolling elements are held by an above-described rolling-element bearing cage.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
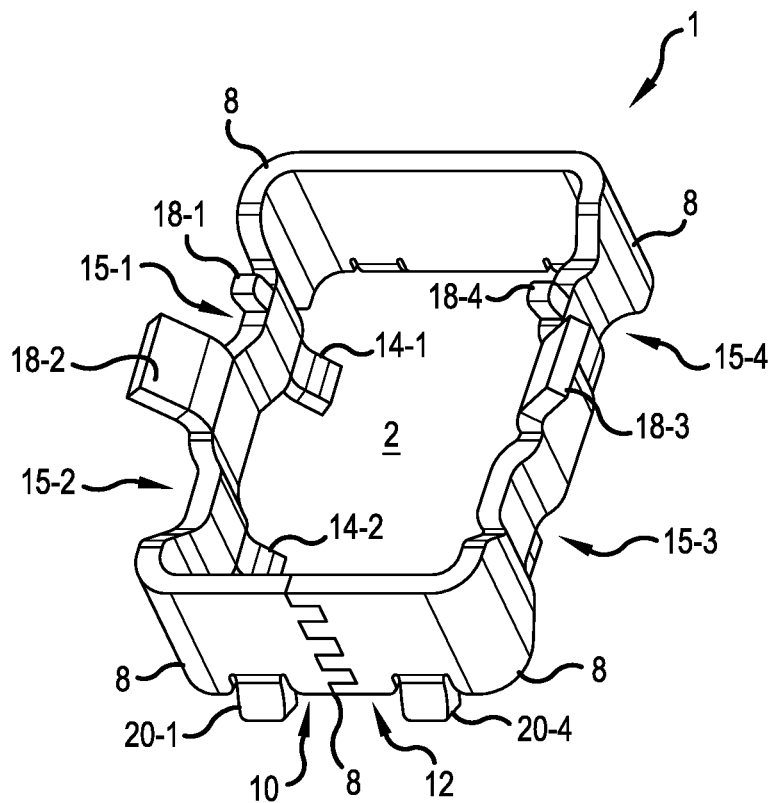
FIG. 1 is a perspective view of a cage segment according to a first embodiment of the present disclosure.
Figure 2:
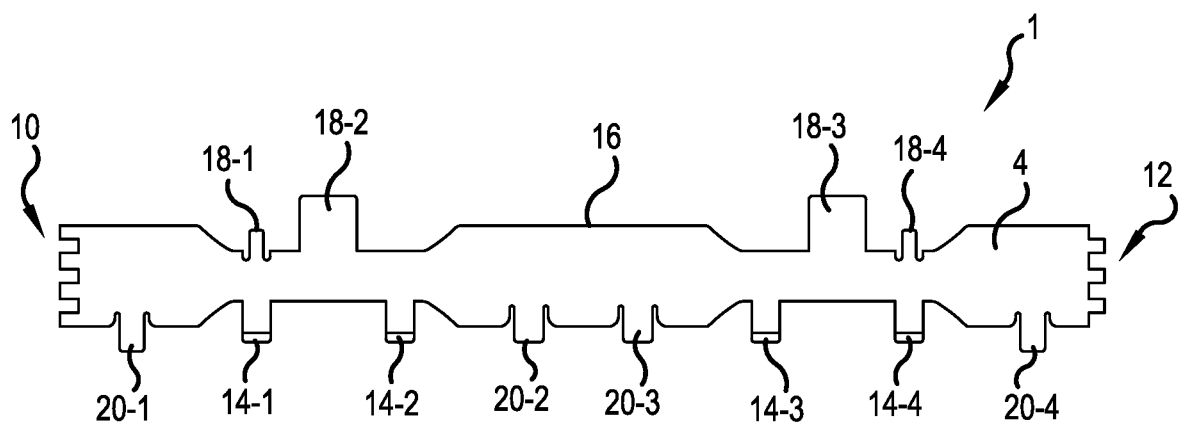
FIG. 2 is a perspective view of a sheet metal component used to form the cage segment of FIG. 1.

With reference to FIGS. 1 and 2, a cage segment 1 is shown according to a first embodiment. FIG. 1 shows a perspective view of the cage segment 1, and FIG. 2 shows a perspective view of a sheet metal component 4 of the cage segment 1 of FIG. 1.

The cage segment 1 comprises a strip-shaped sheet metal component 4 that is joined at a joint 6 in order to form a pocket 2 that is configured to receive at least one rolling element. In a preliminary stage of the manufacturing, the cage segment 1 of FIG. 1 is comprised of a preform or a kit including a flat sheet metal component 4. In order to form or assemble the cage segment 1 from the sheet metal component 4, the sheet metal component 4 is respectively bent at prescribed corner regions 8 and joined at the two ends of the sheet metal component 4, whereby the joint 6 is formed. The assembled cage segment 1 forms the pocket 2 that is suitable for receiving at least one rolling element. The phrase "cage segment" as used herein refers both to the cage segment in its final form as shown in FIG. 1 and to the unfolded cage segment shown in FIG. 2.

A first alignment element 10 and a second alignment element 12 complementary to the first alignment element 10, are provided at the ends of the sheet metal component 4. In the embodiment shown in FIGS. 1 and 2, the alignment elements 10, 12 are rectangular toothings. However, other shapes are also conceivable, such as, for example, wave-shaped, triangular, and/or polygonal. The two alignment elements 10, 12 can be, for example, punched and/or cut. Here the alignment elements 10, 12 are configured to align the cage segment 1 at the joint 6 such that the cage segment can be assembled. In particular, the alignment elements 10, 12 are configured to fix the sides that are attached to each other in a first direction that is perpendicular to the surface of the pocket 2 and to provide an adjustability in at least one direction perpendicular to the first direction, which is suitable to compensate for manufacturing tolerances.

Furthermore, the cage element 1 includes four retaining elements 14-1, 14-2, 14-3, 14-4 that extend into or below the pocket 2 and are configured to hold the rolling element 32 in the pocket 2 at a desired position or to prevent the cage segment 1 from migrating radially outward in use. Furthermore, the cage segment includes four retaining elements 15-1, 15-2, 15-3, 15-4 that protrude into the pocket and that are formed/reshaped, for example, by bending, which are also configured to hold the rolling element at a desired position in the pocket 2. In addition, the retaining elements 15-1, 15-2, 15-3, 15-4 protruding toward the pocket can serve to generate a spacing between the individual rolling elements, in particular in the case wherein the side elements 4 are manufactured from a relatively thin metal plate for strength and/or design reasons. That is, the retaining elements 15-1, 15-2, 15-3, 15-4 protruding toward the pocket can be configured in particular to compensate for a lack of sheet metal thickness and to increase the rigidity of the cage segment.

In addition, on the side of the cage segment 1 facing away from the pocket 2, four retaining elements 18-1, 18-2, 18-3, 18-4 are provided, which are configured to hold a rolling element that is guided outwardly against the cage segment 1. Furthermore, on the surfaces of the cage segment 1 facing towards a flange of a rolling-element bearing, guide elements 20-1, 20-2, 20-3, 20-4 are provided, which guide elements 20-1, 20-2, 20-3, 20-4 are configured to guide a rolling-element bearing cage against a flange of the rolling-element bearing. A guiding of the rolling-element bearing cage against a raceway of the rolling-element bearing can thereby advantageously be avoided, whereby the service life of the raceways can be increased. Furthermore, connecting elements can be provided on the cage segment to which coupling elements can be attached in order to connect the individual cage segments 1 to a rolling-element bearing cage. The shape of the connecting elements is essentially dependent on the coupling element chosen.

The sheet metal component 4 of the cage segment 1 is cut from a metal plate using a laser. Here before the cage segment is assembled, the outer contour of the sheet metal component includes a plurality of projections and openings which, in the assembled form of the cage segment 1, form the above-mentioned functional elements 14, 18, 20, by being bent out from the plane of the sheet metal component 4, as can be seen in FIG. 1. That is, the sheet metal component 4 is released from the sheet metal panel with all projections and openings that are required for forming the later functional element, and subsequently formed or assembled. Here the functional elements 14, 18, 20 can be bent out from the plane of the sheet metal component 4 before the final forming/assembly, or bent out from the plane of the sheet metal component 4 after the forming/assembly. Of course, the functional element can also form recesses and projections that are configured, for example, to hold a rolling element in the cage segment 1 or to position a rolling element at a desired position. Due to the contouring of the sheet metal component 4 and the associated reduction of the amount of material in the finished cage segment as compared to a cage segment that has been manufactured from an essentially rectangular sheet metal component, the cage segment 1 is lighter.

Figure 3:
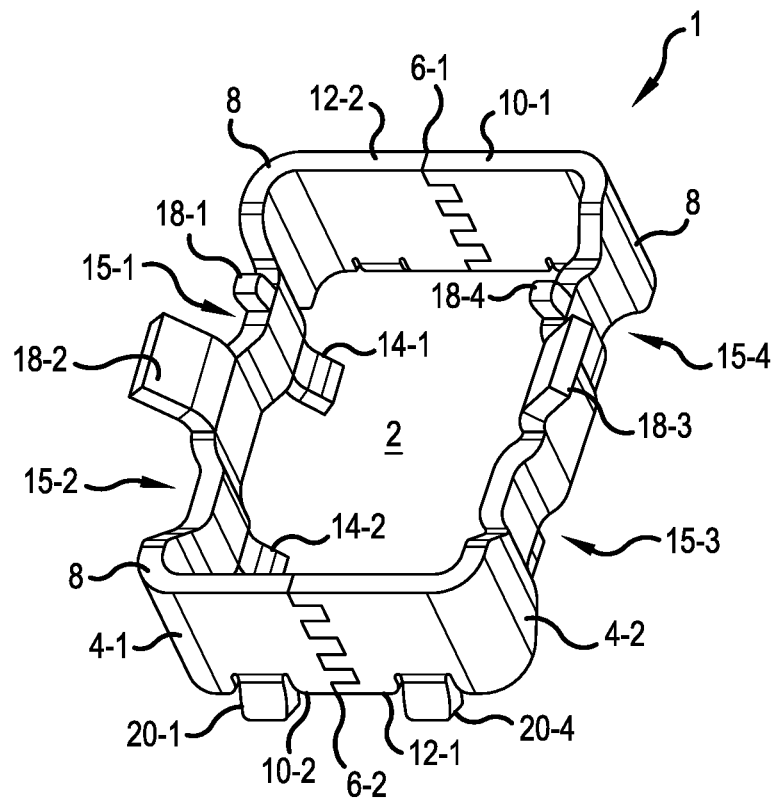
FIG. 3 is a perspective view of a cage segment according to a second embodiment of the present disclosure.
Figure 4:
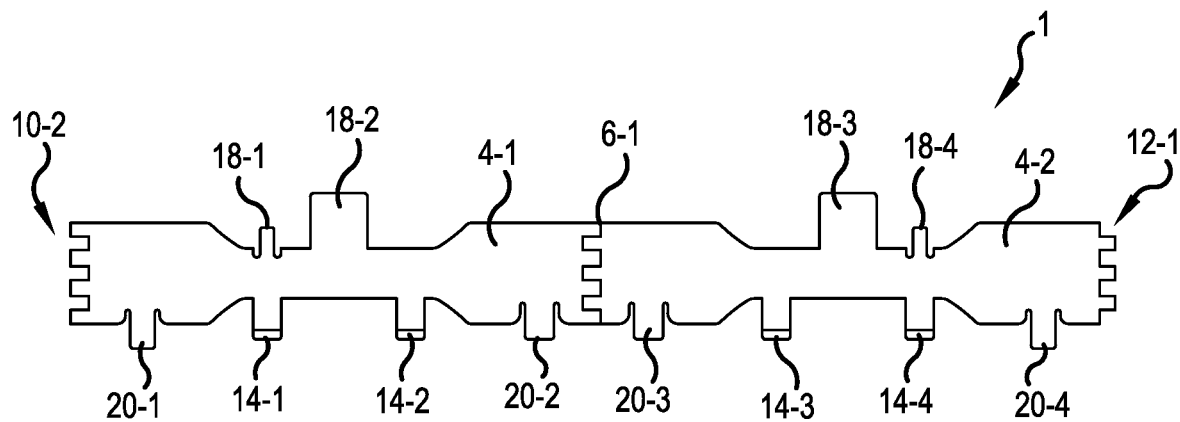
FIG. 4 is a perspective view of a sheet metal component used to form the cage segment of FIG. 3.

With reference to FIGS. 3 and 4, a cage segment 1 is shown according to a second embodiment. FIG. 3 shows a perspective view of the cage segment 1, and FIG. 4 shows a perspective view of a sheet metal component 4 of the cage segment 1 of FIG. 3. In contrast to the cage segment of FIGS. 1 and 2, the cage segment of FIGS. 3 and 4 comprises two sheet metal components 4-1, 4-2, which are joined at two joints 6-1, 6-2. Alternatively it is also conceivable to provide more than two joints, such as, for example, four or more joints.

Figure 5:
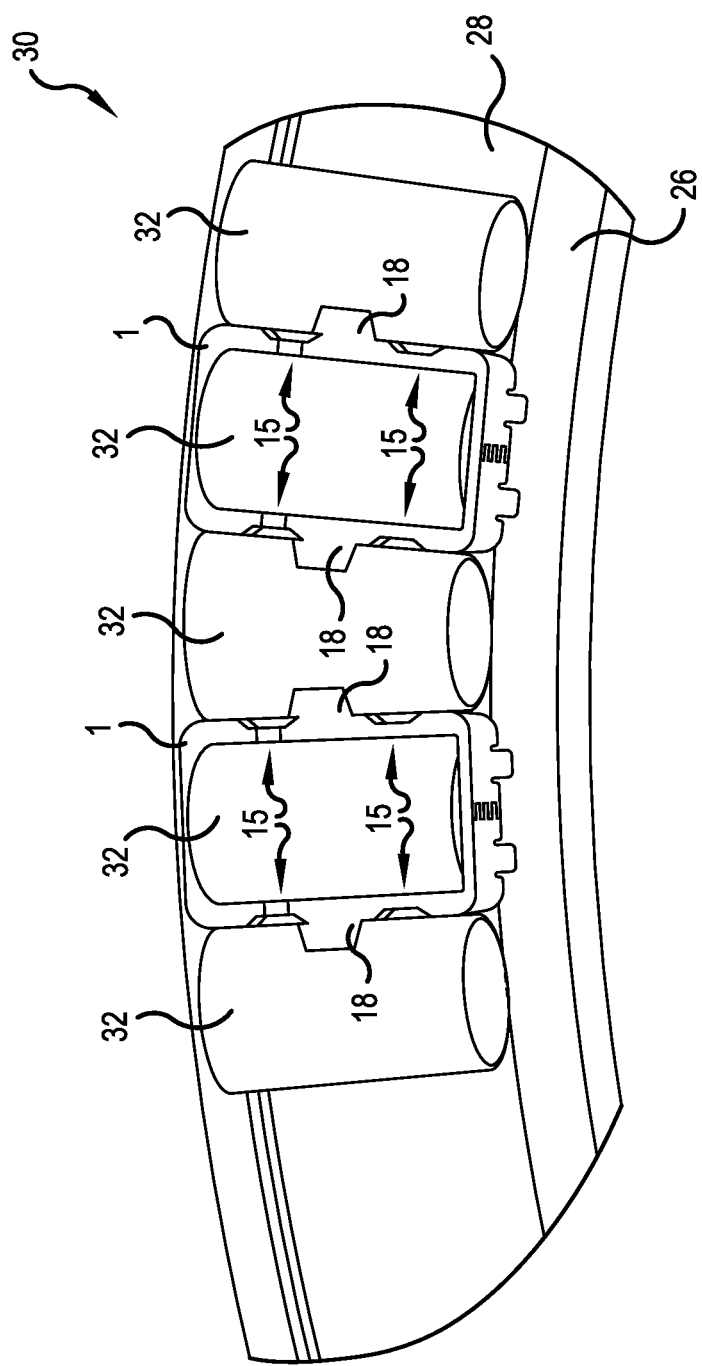
FIG. 5 is a perspective view of a rolling-element bearing cage formed from a plurality of the cage segments of FIG. 1.

FIG. 5 shows a perspective view of a section of a rolling-element bearing cage 30 formed from a plurality of the cage segments 1 of FIG. 1. The rolling-element bearing cage 30 can preferably be used in large rolling-element bearings having a diameter of more than one meter. The rolling-element bearing cage 30 has a plurality of cage segments 1 as described above, and the plurality of cage segments 1 are connected by a plurality of coupling elements (not shown). Here in the rolling-element bearing cage 30, every second rolling element 32 is guided in a pocket 2 of the cage segment 1, while the other half of the rolling elements 32 are respectively guided between two cage segments 1. Alternatively a cage segment 1 can also be provided for each rolling element 32. The rolling elements 32 roll on an inner raceway 28 of an inner ring 26 and on the outer raceway of an outer ring (not shown) of a rolling-element bearing, in order to enable a relative rotation of the inner ring and of the outer ring. As is shown, for example, in FIG. 1, the cage includes both tabs 18, which are configured to hold the rolling elements 32 that are disposed between the cage segments 1, and retaining elements 15, which project inward into the pocket to hold the rolling elements 32.

In order to reduce the material usage and the manufacturing expense, the cage segment 1 is made from sheet metal so that a material- and effort-intensive machining method can be omitted. Here in a preliminary stage of the manufacturing, the cage segment 1 is present as a preform or a kit that is comprised of one or more flat sheet metal components 4, which are provided with functional elements that are configured for holding and guiding of rolling elements, for guiding of the cage segments, and/or for connecting the cage segments to one another. Here the functional elements may be already incorporated into the contour of the sheet metal components when the sheet metal components are released from the metal plate. The cage segment 1 can thereby be manufactured with a small material use and/or a high degree of material utilization, as well as with a relatively low work expense and thus cost-effectively, in particular even with small quantities.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved cage segments for rolling element bearing cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Cage segment
2 Pocket
4 Sheet metal component
6 Joint
8 Corner
10 First alignment element
12 Second alignment element
14 Retaining element
15 Retaining element
16 Contour
18 Tab
20 Guide element
26 Inner ring
28 Inner raceway
30 Rolling-element bearing cage
32 Rolling element

What is claimed is:

1. A single-pocket cage segment of a multipart rolling-element bearing cage, the cage segment comprising:
   first and second side walls connected by first and second end walls and defining a pocket,
   wherein the first and second side walls and the first and second end walls are formed by at least one sheet metal segment having at least two ends connected at at least one joint, and
   wherein the first side wall includes a projection bent out of a plane of the first side wall and/or the first end wall includes a projection bent out of a plane of the first end wall.

2. The cage element according to claim 1, wherein the at least one sheet metal segment is cut from a metal sheet using a laser, punched, and/or nibbled.

3. The cage segment according to claim 1, wherein the projection comprises a tongue.

4. The cage segment according to claim 3, wherein the tongue is formed by a contour of the at least one sheet metal segment.

5. The cage segment according to claim 3, wherein the tongue projects from an outer periphery of the at least one sheet metal segment.

6. The cage segment according to claim 1, wherein the projection comprises a first portion of the at least one sheet metal segment offset into the pocket relative to an adjacent portion of the at least one sheet metal segment.

7. The cage segment according to claim 1, wherein the projection is a retaining element configured to interact with a rolling element in order to hold or guide the rolling element.

8. The cage segment according to claim 1, wherein the projection is a guide element configured to interact with a flange in order to guide the cage segment.

9. The cage segment according to claim 1, wherein the projection is a connecting element configured to interact with a coupling element to connect the cage segment to a further cage segment.

10. A rolling-element bearing cage including a plurality of cage segments according to claim 1.

11. The rolling-element bearing cage according to claim 10, wherein the plurality of cage segments each include a coupling element and are coupled together by a connecting element.

12. A rolling-element bearing comprising:
    an inner ring,
    an outer ring, and
    a plurality of rolling elements disposed between the inner ring and the outer ring, and
    a multipart rolling-element bearing cage comprising a plurality of single-pocket cage segments, each of the cage segments comprising first and second side walls connected by first and second end walls, wherein the first and second side walls and the first and second end walls are formed by at least one sheet metal segment having at least two ends connected at at least one joint, and wherein the at least one cage segment includes at least one functional element, and
    wherein a first subset of the plurality of rolling elements are located in the plurality of cage segments and a second subset of the plurality of rolling elements are located between adjunct pairs of the plurality of cage segments.

13. The cage segment according to claim 1, wherein the at least one joint includes a first alignment structure and a second alignment structure complementary to the first alignment element.

14. A method comprising:
    providing a plurality of the cage segments according to claim 1,
    installing one of a first set of rolling elements into each of the plurality of cage segments, and
    arranging the plurality of cage segments and inserted rolling elements on a bearing ring with one of a second set of rolling elements between each adjacent pair of the plurality of cage segments.

15. A method comprising:
    laser cutting a plurality of planar strips of material from a metal sheet, each of the strips having a first end and a second end, an outer periphery including a plurality of tongues and a first section and a second section each having a first width and a third section between the first section and the second section having a second width less than the first width,
    bending at least one of the plurality of tongues out of the plane of each of the plurality of strips,
    bending the third section out of the plane of each of the plurality of strips relative to the first section and the second section, and connecting the first end of each of the plurality of strips to the respective second end of each of the plurality of strips to form a plurality of single-pocket cage segments of a multipart rolling-element bearing cage.

16. The method according to claim 15, further comprising:
installing one of a first set of rolling elements into each of the plurality of cage segments, and
arranging the plurality of cage segments and inserted rolling elements on a bearing ring with one of a second set of rolling elements between each adjacent pair of the plurality of cage segments.

17. The method according to claim 15,
wherein the connecting occurs after the bending of the at least one of the plurality of tongues and after the bending of the third sections.

18. The method according to claim 15,
wherein the connecting the first end of each of the plurality of strips to the respective second end of each of the plurality of strips comprises connecting a the first end of each of the plurality of strips to the respective second end of each of the plurality of strips by an additional strip of material.

* * * * *